C. C. Bradley, Jr.,
Grinding Metals.
Nº 16,679.   Patented Feb. 24, 1857.
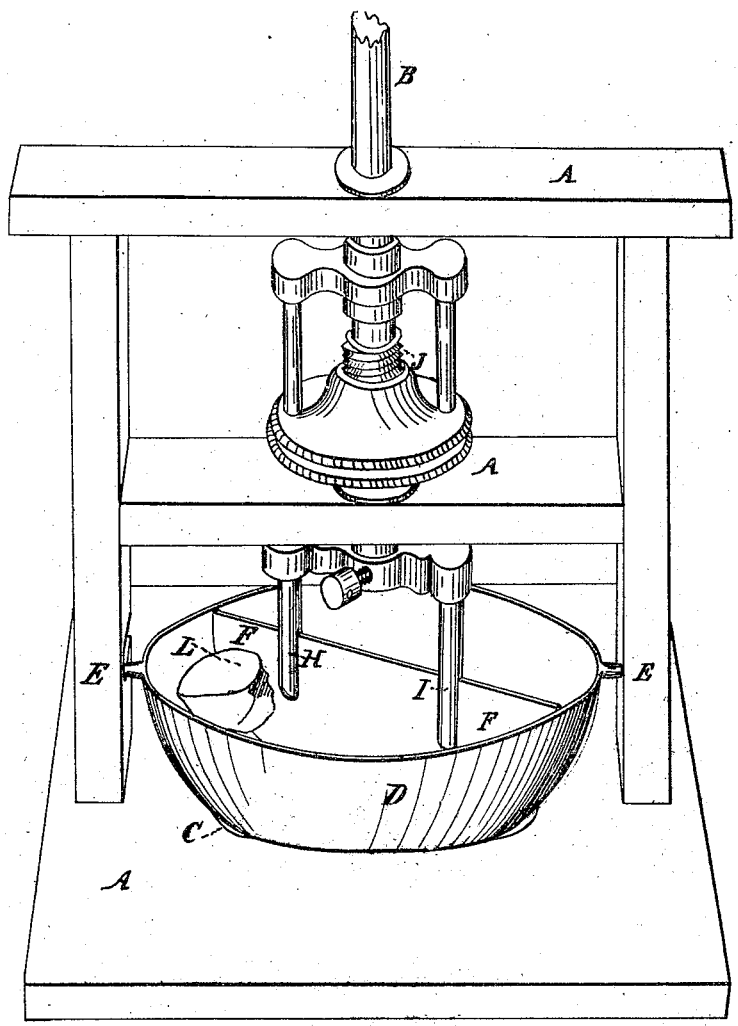

UNITED STATES PATENT OFFICE.

CHRISTOPHER C. BRADLEY, JR., OF SYRACUSE, NEW YORK.

GRINDING THE INNER SURFACE OF CAST-IRON KETTLES.

Specification forming part of Letters Patent No. 16,679, dated February 24, 1857; Reissued May 1, 1860, No. 954.

*To all whom it may concern:*

Be it known that I, CHRISTOPHER C. BRADLEY, Jr., of the city of Syracuse, in the county of Onondaga and State of New York, have invented a new and useful Improvement in Grinding the Inner Surface of Kettles; and I do hereby declare the following to be a full, clear, and exact description of the construction of the same, reference being had to the annexed drawings, making part of this specification.

My invention is for the purpose of grinding out the inner surface of large kettles, such as generally used in manufacturing salt, etc.

To use my invention make a strong frame work (A) by having two firm upright posts, a base, and cross beams as seen in the drawings. In the base piece make a sink or depression (C) to receive the bottom part of the kettle. Place the kettle (D) firmly between the posts (E). In the kettle place the plate (F) shaped on its lower edge to correspond with the form of the kettle. The plate (F) is connected by arms (H and I) with a revolving shaft (B) which is connected with machinery for giving it motion. The plate (F), which may be of metal or wood, when revolving forces around the kettle pieces of grindstone, of which there may be several pieces on each side of the plate (F). The revolving plate (F) may be raised or lowered at pleasure by the nut and screw (J).

The object of the arrangements of the several parts is to cause the revolution of the loose pieces of grindstone upon the inner surface of the kettle. While the motion is slow, the grindstones (L) revolve at the bottom part of the kettle, when that part is ground sufficiently, the speed of the shaft and plate is increased and causes the grindstones by centrifugal force to leave the center and operate upon another portion of the surface; by successively increasing the speed of the fans or plates the grindstones are made to act upon the whole inner surface of the kettle. When the speed is so far increased as to cause the grindstones to revolve near the upper edge of the kettle their centrifugal force serves to make them act upon the kettle; while the speed is less they are pressed against the iron by their weight. By this method the grindstones being free to rest their whole weight upon the surface, it is found that they work into all uneven spots and the whole surface is perfectly ground.

What I claim as my invention and desire to secure by Letters Patent, is,—

The arrangement of the revolving shaft, vertical fans, and the grindstones, with respect to the kettle as described, when the grindstones operate upon successive portions of the kettle by a change of velocity in the shaft as set forth.

CHRISTOPHER C. BRADLEY. JR.

Witnesses:
R. F. STEVENS,
C. C. BRADLEY.

[FIRST PRINTED 1912.]